United States Patent
Hume et al.

[11] Patent Number: 5,871,786
[45] Date of Patent: Feb. 16, 1999

[54] TIP HEATED HOT RUNNER NOZZLE

[75] Inventors: William J. Hume, West Newbury; Michael L. Vasapoli, Gloucester, both of Mass.

[73] Assignee: Kona Corporation, Gloucester, Mass.

[21] Appl. No.: 833,414

[22] Filed: Apr. 4, 1997

[51] Int. Cl.⁶ .......................... B29C 45/20; B29C 45/22; B29C 45/23

[52] U.S. Cl. .................. 425/549; 264/328.15; 425/562; 425/564; 425/573

[58] Field of Search ..................... 425/549, 573, 425/588, 562, 564, 566; 264/328.15

[56] References Cited

U.S. PATENT DOCUMENTS

| | | | |
|---|---|---|---|
| 4,389,002 | 6/1983 | Devellian et al. | 425/549 |
| 4,517,453 | 5/1985 | Tsutsumi | 219/421 |
| 4,704,516 | 11/1987 | Tsutsumi | 219/421 |
| 4,734,243 | 3/1988 | Kohama et al. | 264/328.8 |
| 4,740,674 | 4/1988 | Tsutsumi | 219/523 |
| 4,894,197 | 1/1990 | Tsutsumi | 264/297.2 |
| 4,899,288 | 2/1990 | Tsutsumi | 364/476 |
| 4,902,219 | 2/1990 | Leverenz | 425/549 |
| 5,061,174 | 10/1991 | Gellert | 425/549 |
| 5,223,275 | 6/1993 | Gellert . | |
| 5,403,536 | 4/1995 | Hanyuda et al. | 264/328.9 |
| 5,456,592 | 10/1995 | Shindo | 425/549 |
| 5,470,219 | 11/1995 | Yokoyama et al. . | |
| 5,492,467 | 2/1996 | Hume et al. | 425/549 |
| 5,504,304 | 4/1996 | Noguchi et al. | 219/426 |
| 5,545,028 | 8/1996 | Hume et al. | 425/549 |
| 5,554,395 | 9/1996 | Hume et al. | 425/549 |
| 5,674,439 | 10/1997 | Hume et al. | 425/549 |

OTHER PUBLICATIONS

INCOE XRC II bushings with the Thermal–Tip™ give you extra control in the critical area of the gate . . . INCOE Corporation, 2 pgs.

*Primary Examiner*—Tim Heitbrink
*Attorney, Agent, or Firm*—Wolf, Greenfield & Sacks, P.C.

[57] ABSTRACT

An injection molding nozzle is provided that includes a heater disposed about an insert seated in the nozzle body. The heater provides extra heat about the insert where heat loss to the mold can cause a reduction in melt temperature. The heater remains on from one injection cycle to the next injection cycle. In one embodiment, a thermocouple is used to measure the temperature about the insert so that the intensity of the heater can be adjusted accordingly. The heater can also be used with nozzles used in multiple nozzle applications to balance the flow of the nozzles.

43 Claims, 11 Drawing Sheets

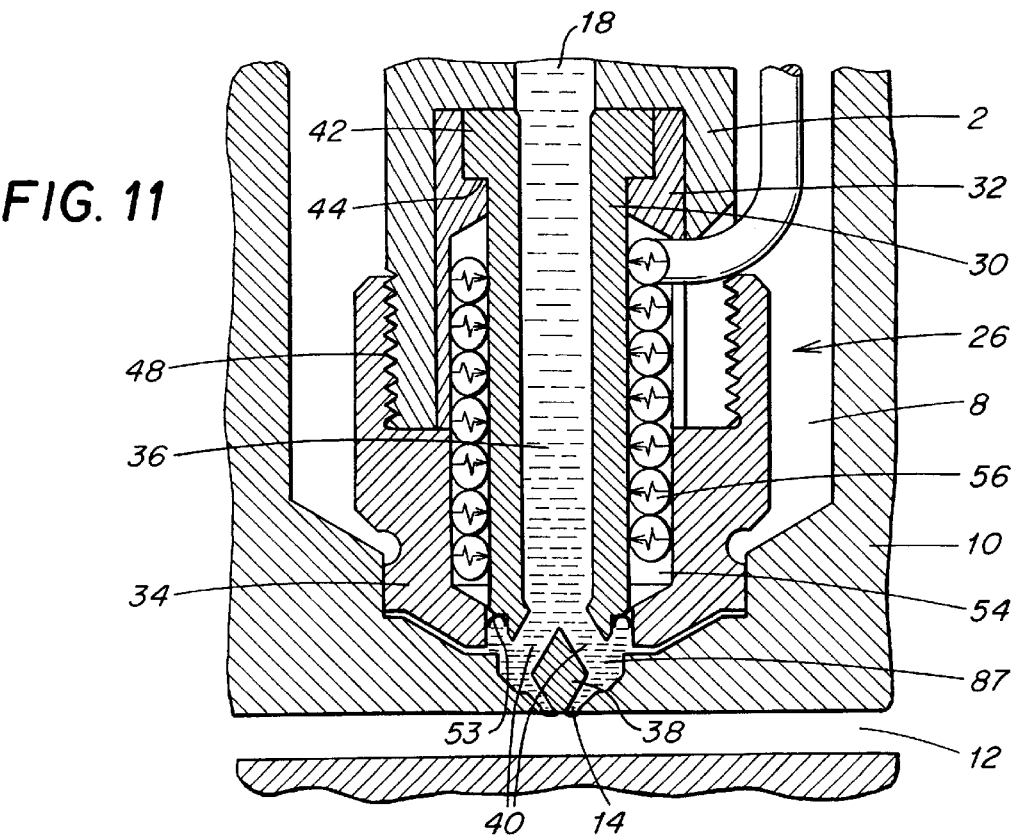
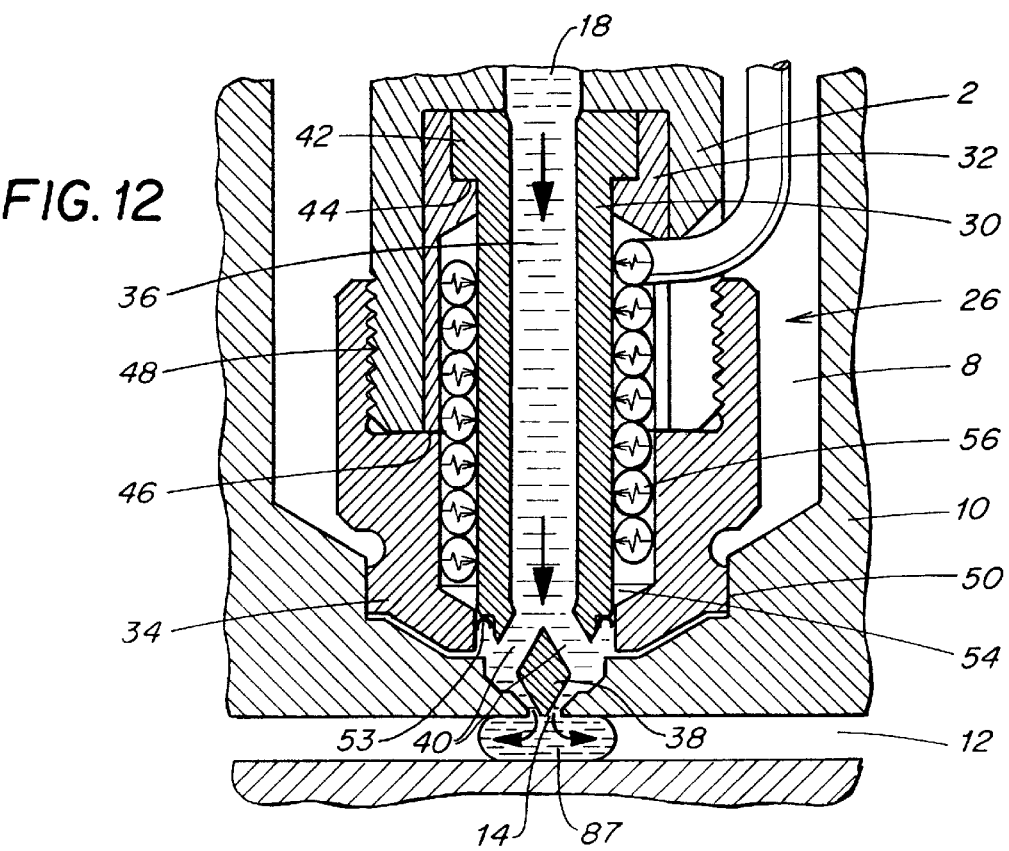

TIP HEATED HOT RUNNER NOZZLE

BACKGROUND OF THE INVENTION

1. Field of the Invention

The present invention relates in general to injection molding systems. More particularly, the invention relates to a hot runner nozzle having a heated tip.

2. Discussion of the Related Art

A primary concern in injection molding is the necessity to keep the material melt flowing at its optimum processing temperature until it enters the gate to the cavity of the cooled mold where the plastic product is formed. If the melt temperature is too high, the melt can burn or degrade resulting in a poor quality product. If the melt temperature is too low the melt flow can be retarded or even freeze up, and visible imperfections in the molded product may result.

As the melt travels down the length of the hot runner nozzle, it nears the gate where the melt exits the heated nozzle and enters the cooled mold. Heat loss from the nozzle to the mold is greatest in the gate area. Further, the end of the nozzle can contact the mold to form a seal about the gate area to prevent melt form leaking about the nozzle body. This contact area can cause further heat loss from the nozzle to the mold. The heat loss can result in a reduction in melt temperature near the gate area, and the consequent problems mentioned above can occur. Nozzle heaters such as coil heaters disposed about the nozzle are used to keep the nozzle, and melt traveling therethrough, at a uniform, constant temperature. However, these heaters do not typically extend past where a nozzle insert can be seated in the nozzle body. Thus, in the area where the melt is most susceptible to a reduction in temperature due to the proximity of the mold, there is no external heating present.

The problem of heat loss about the gate is magnified when dealing with a material with a small processing window, such as semi-crystalline materials, in which the difference between the processing temperature and the no-flow temperature of the plastic can be as small as 30° F. If the end of the nozzle near the gate area runs too cold the melt can freeze in the insert during cycle interruptions. If this happens, it is necessary to apply external heat to the tip to unfreeze the melt, such as a blow torch. Further, material left in the insert between cycles can cool and during the next injection cycle, the cold material can contact a side wall of the mold cavity appearing as blush in the molded part. The blush will show as an unacceptable imperfection in the finished product.

Another problem which arises due to heat loss about the gate occurs in multiple nozzle, single cavity applications. In such applications, multiple nozzles work in conjunction to simultaneously inject melt into a single cavity. This arrangement is typically used for complex, thin walled products, such as automotive battery containers. In this application balanced flow of the nozzles into the cavity is critical. Between injection cycles the plastic will freeze off in the gate forming a thin layer of frozen plastic. Upon initiation of injection the pressure exerted on the gate will blow the frozen plastic into the cavity and remelt it. Cores of the mold cavity separating the walls of the product can shift if the plastic does not flow evenly and simultaneously about the six cores. If the temperatures at the gate and in the insert vary, the width of the layer of frozen plastic will vary from nozzle to nozzle. The thicker the layer, the more pressure it takes for the nozzle to begin extruding melt into the cavity. Thus, different starting times and consequent uneven melt flow results. This can result in unacceptable, and uneven cavity wall thickness due to core shifting. One method currently used to address this problem is to vary the bore diameters in each nozzle to compensate for uneven material flow. However, it is tedious and time consuming to change the bore diameter, and variations in the material or process can alter the flow balance.

Accordingly, it is one object of the present invention to maintain the hot runner nozzle at a uniform temperature down its length to keep the melt at a constant and uniform temperature.

It is another object of the present invention to provide additional heat at the insert where heat loss to the mold is greatest.

It is another object of the present invention to provide a multiple injection single cavity system that has a balanced flow.

It is another object of the present invention to provide a tip heated hot runner nozzle having a variety of different types of inserts including free flow, cone shaped, spiral, and valve pin.

SUMMARY OF THE INVENTION

In one illustrative embodiment of the invention an injection molding nozzle for injecting molten material into a mold cavity during an injection cycle is provided. The injection molding nozzle includes a nozzle body having a central bore through which the molten material passes during the injection cycle; an insert seated in the nozzle body, the insert having a central bore through which the molten material passes from the central bore of the nozzle body during the injection cycle; and a tip attached to the nozzle body about the insert that forms a seal with the mold cavity. The tip insulates the insert from the mold so that there is an absence of contact between the insert and the mold, and a recess is formed between the insert and the tip. The nozzle further includes a first heater disposed in the recess between the insert and the tip.

In another illustrative embodiment of the invention, an injection molding nozzle for injecting molten material into a mold cavity during an injection cycle is provided. The injection molding nozzle includes a nozzle body having a central bore through which molten material passes during the injection cycle; an insert seated in the nozzle body, the insert having a central bore through which molten material passes from the central bore of the nozzle body during the injection cycle; and a heater disposed about the insert, the heater being adapted to remain on from one injection cycle to a next injection cycle.

In another illustrative embodiment of the invention, a plurality of injection molding nozzles for injecting molten material into a single mold cavity is provided. Each nozzle includes a nozzle body having a central bore through which material passes during the injection cycle; an insert seated in the nozzle body, the insert having a central bore through which molten material passes from the central bore of the nozzle body during the injection cycle; and a heater disposed about the insert. Each of the heaters of each of the plurality of injection molding nozzles is adapted to be controllable, independent from one another.

BRIEF DESCRIPTION OF THE DRAWINGS

The invention will be better understood and appreciated from the following detailed description of illustrative embodiments thereof, and the accompanying drawings, in which:

FIG. 11 is the cross-sectional view of FIG. 2, showing the melt at the gate before an injection cycle begins;

FIG. 12 is the cross-sectional view of FIG. 2, showing the melt injected into the cavity after an injection cycle begins;

DETAILED DESCRIPTION

Figure 1:
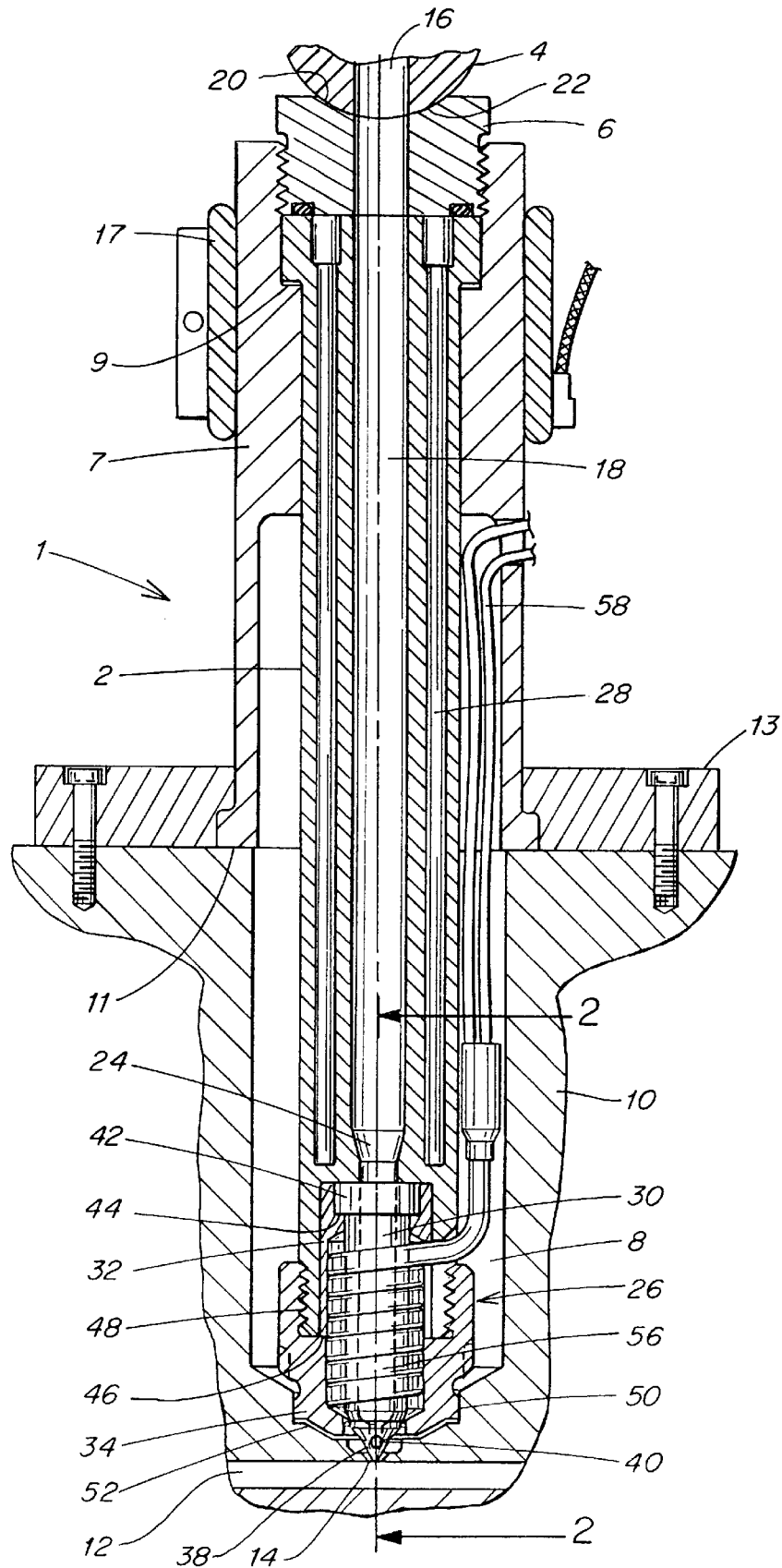
FIG. 1 is a cross-sectional side view of a first illustrative embodiment of the present invention.

The present invention relates to an injection molding system having a tip-heated hot runner nozzle. FIGS. 1–4 show a first illustrative embodiment of an injection molding system 1 according to the present invention. This embodiment is a single nozzle application, in which the nozzle body, or sprue bushing, 2 is coupled to an extruder nozzle 4 of an injection molding machine (not shown) via a hard seat 6. The nozzle body 2 is shown disposed in a recess 8 of a mold 10 for making a plastic article. The plastic article is formed in a cavity 12 in the mold by injecting plastic melt from a gate 14 formed in the mold 10. The hard seat 6 has an inwardly curved surface 20 to mate with the outwardly curved surface 22 of the extruder nozzle 4. The hard seat is threaded into an insulating sleeve 7 which has a ledge 9 on which the nozzle body 2 sits. The insulating sleeve 7 sits on the mold at 11 and serves to thermally isolate the nozzle body from the cooled mold 10. A support ring 13 centers and secures the insulating sleeve 7 and the nozzle body 2 to the mold. It should be understood that the invention is not limited to single nozzle applications, and that a multiple gate system could be used, in which several nozzles 2 are coupled to a heated manifold. The heated manifold would then be coupled to the injection molding machine. Also, the multiple gate system could be used in single or multiple cavity applications.

To form a molded article, liquefied melt is injected under pressure from the extruder nozzle 4 of an injection molding machine (not shown). A central passage 16 of the extruder nozzle feeds into a central bore 18 in the nozzle body via the hard seat 6. The melt flows though the bore 18 within the nozzle 2, to a section 24 of the bore that narrows and feeds into an end assembly 26. To maintain the melt uniformly at its optimum processing temperature, heat pipes 28 are disposed within, and about the circumference of, the nozzle body 2. The heat pipes derive heat from a band heater 17 which is disposed about the insulating sleeve 7. In multiple nozzle applications, the heat pipes 28 may alternatively derive heat directly from the heated manifold, rather than from a band heater. Heat pipes such as these are described in U.S. Pat. No. 4,389,002, which is herein incorporated by reference. Other means of heating the nozzle body can also be used, such as helical heaters.

The end assembly 26 comprises an insert 30, a sleeve 32, and a tip 34. The insert has a central bore 36 aligned with the bore 18 of the nozzle body 2, and through which melt passes toward the gate 14. The insert, the inner surface of which is constantly exposed to the flow of melt, is preferably made of a hard material such as hardened steel, for example D-2 or CPM-9V, which is not susceptible to abrasive melt materials which can wear away softer metals. Alternatively, the insert 30 could be formed of beryllium copper or another material of high thermal conductivity to facilitate thermal conduction to the gate 14. If beryllium copper were used, an inner hardened steel lining could be used to protect the insert 30 from the eroding flow of melt. If relatively non-abrasive material are used, no steel lining is needed and beryllium copper can be used by itself.

In the embodiment of FIGS. 1–4 the insert 30 has a cone shaped tip 38 having circumferential outlets 40 through which the melts passes. The cone-shaped tip helps reduce the size of the vestige at the gate that can appear on the molded article. It should be noted that the invention is not limited to an insert having a cone-shaped tip configuration. As shown hereinafter, tip configurations other than cone-shaped can be used. For example, an insert with a spiral tip, or an open full flow insert could be used. Furthermore, nozzles having valve pins which close the gate can also be used.

Figure 2:
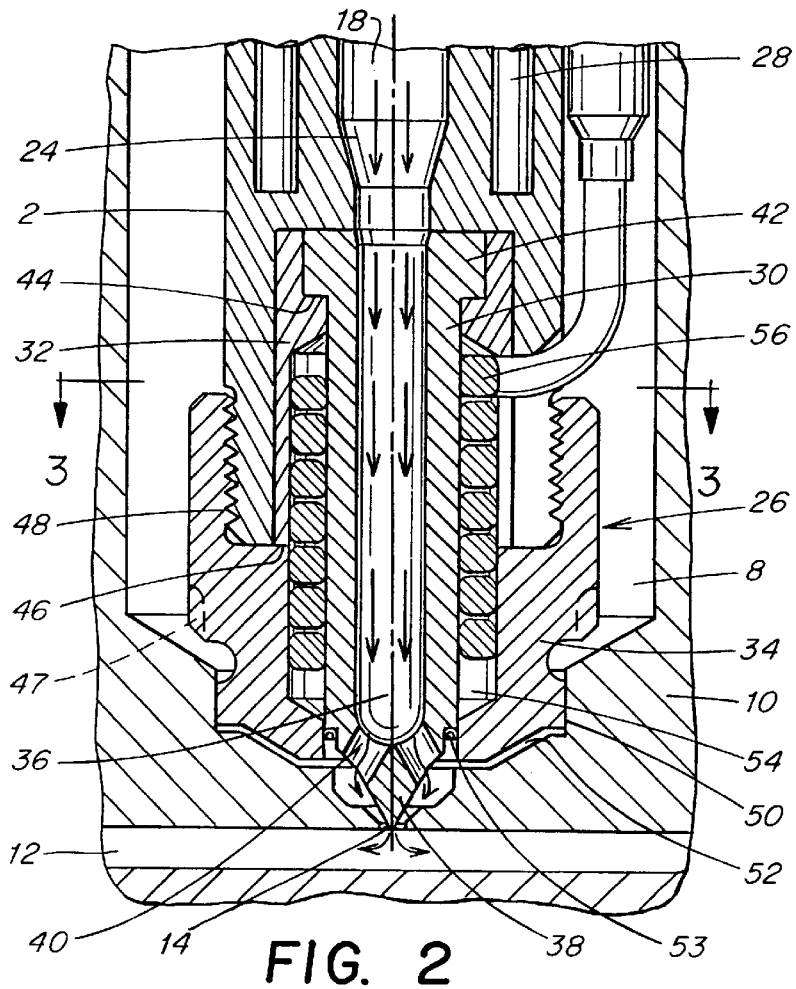
FIG. 2 is a cross-sectional view taken along line 2—2 of FIG. 1.
Figure 3:
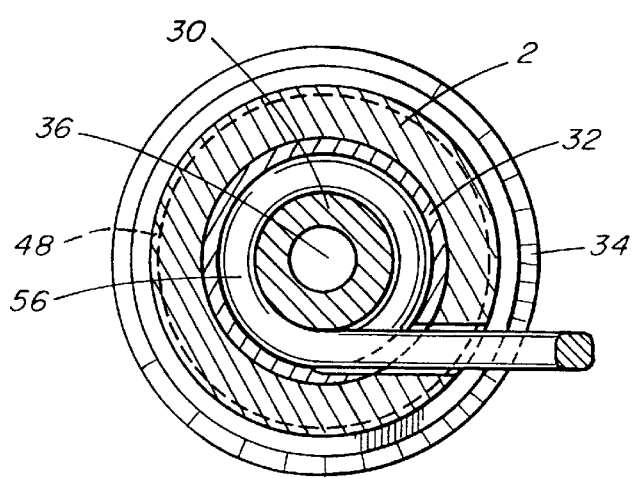
FIG. 3 is a cross sectional plan view taken along line 3—3 of FIG. 2.
Figure 4:
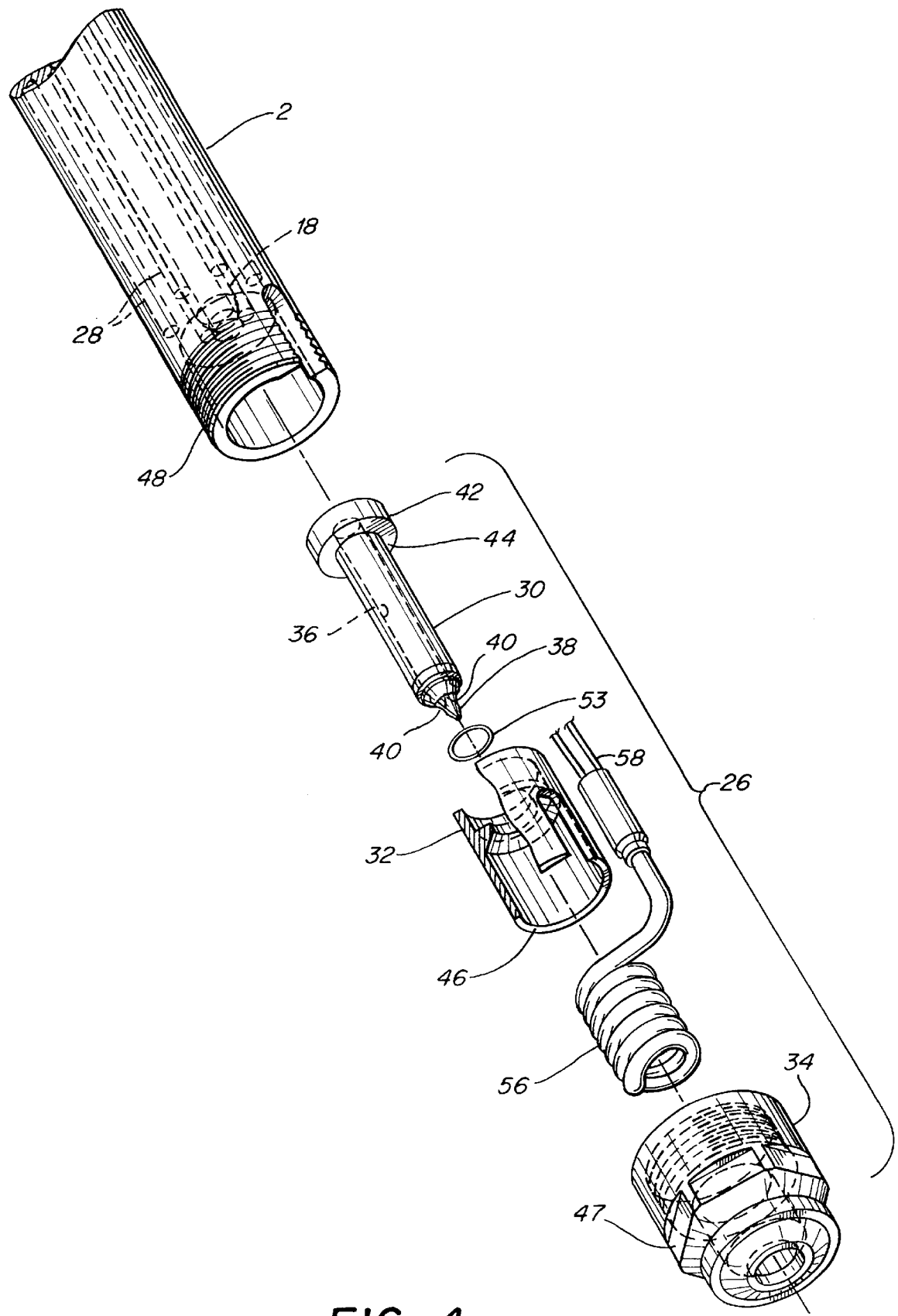
FIG. 4 is an exploded perspective view of FIG. 1.

The insert 30 is held in place by the sleeve 32 and the tip 34. The insert 30 has a portion 42 of greater diameter that is seated in the nozzle body 2. The insert includes a ledge 44, formed where the diameter of the insert is reduced, which the sleeve 32 is machined to fit about. The tip 34 is threaded onto the nozzle body at 48 and abuts the sleeve at 46 to hold both the sleeve and insert in place. As seen in FIG. 4, a portion 47 of the tip is hexagonally shaped to facilitate threading the tip onto the nozzle body. The tip 34 can be made of stainless steel or titanium alloy, or any appropriate material having relatively low thermal conductivity. The-tip is preferably formed of a material having low thermal conductivity to minimize heat loss to the mold 10. The tip 34 contacts and forms a seal with the mold 10 at 50. The seal 50 prevents melt from escaping into the recess 8 which forms an insulative air space about the nozzle body to further minimize heat transfer from the nozzle 2 to the mold 10. A space 52 exists between the mold and tip. As shown in FIGS. 1 and 2 the mold is machined to the shape of the tip. Melt will fill the space 52 during injection molding and also provides some insulation. The space 52 also permits some tolerance between the length of the nozzle and the mold.

The sleeve 32 and the tip 34 are shaped so as to form a circumferential recess 54 about the insert 30. Disposed in this recess 54 between the insert 30, and the sleeve 32 and the tip 34, is a coil heater 56 that is wound about a substantial portion of the insert 30. A seal 53 is disposed between the tip 34 and the insert 30. The seal 53 serves to prevent melt from escaping into the recess 54 where the coil heater is disposed.

During injection molding it is desirable to keep the melt at a constant temperature, as close to its optimum processing temperature as possible, until the melt exits the nozzle at gate 14 and reaches the mold cavity 12. As seen in FIG. 1, the heat pipes 28 do not extend past the end assembly 26 where the insert is seated in the nozzle body, thus, without the coil heater the melt temperature would begin to decrease as it passes the end of the heat pipes and travels through the end assembly 26 through the bore 36 of the insert 30 to the mold. This reduction in temperature is further exaggerated due to the increasing heat loss to the cooled mold 10 about the gate area. The coil heater, in combination with the nozzle heater, maintains the melt at a constant temperature through the entire length of the nozzle to the gate 14. Ideally, the heat pipes 28, the coil heater 56 and the injection molding machine are all set to about the same temperature, which is the optimum processing temperature of the material.

Leads 58 are coupled to the coil heater 56 at one end, and to a controller (not shown) which is used to increase or decrease the temperature of the coil heater by increasing the voltage supplied to the leads. This enables one to vary the temperature at the tip according the results obtained in a previous injection cycle. For example, if the melt material was running too cold and tended to freeze up or slowed in the end assembly, the temperature could be increased by increasing the power; if the temperature was running too hot and burning the melt the temperature could be decreased. Thus, the controlled coil heater enables the melt to be maintained at its optimum flow temperature. It should be noted that the use of the tip coil heater 56 and the heat pipes 28 requires only one controller, as the heat pipes do not require separate control since they draw heat from the band heater 17, or from a manifold when used in a multiple nozzle application. Further, both a band heater and a manifold could be used together to heat the nozzle body and heat pipes.

Figure 5:
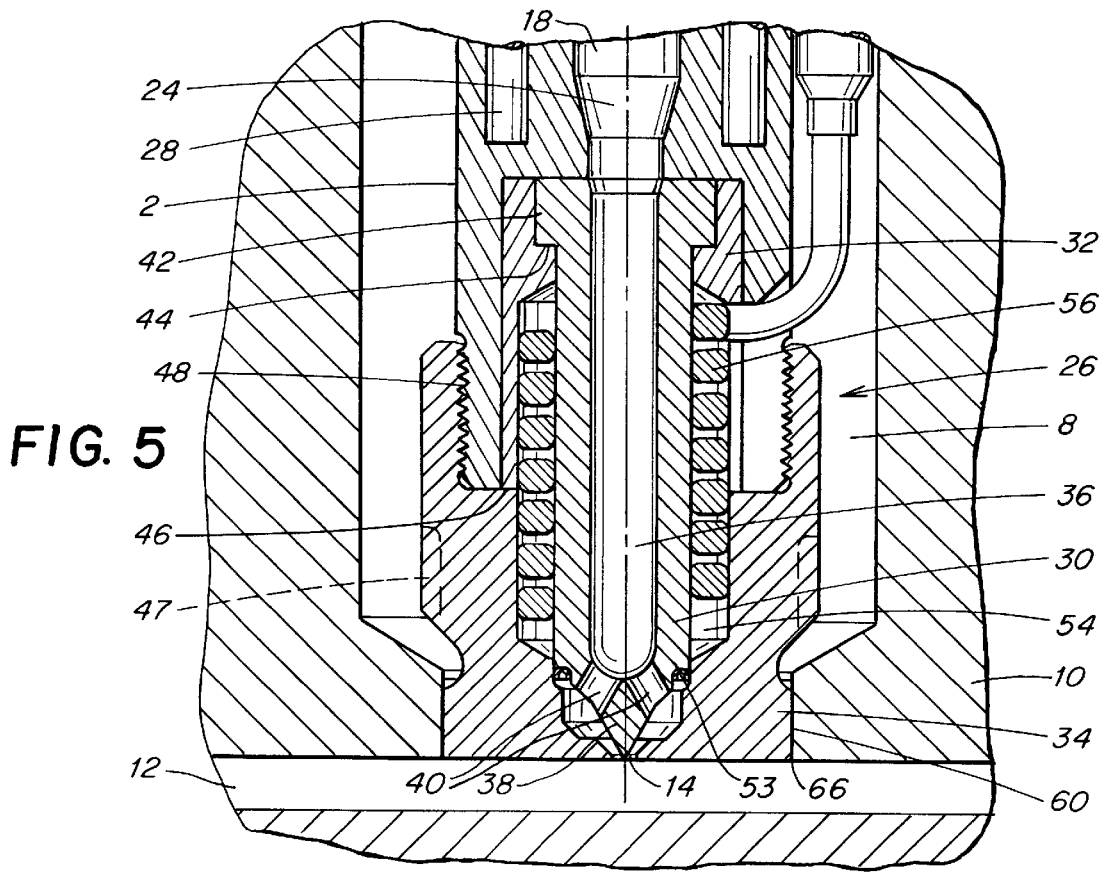
FIG. 5 is a cross-sectional view of a second illustrative embodiment of the present invention.

FIG. 5 shows a second illustrative embodiment of the invention in which the tip 34 forms the gate 14, unlike the embodiment of FIGS. 1–4 in which the gate is formed by the mold itself. The mold is machined to receive and form a seal with the tip 34 at 60. An advantage over the embodiment illustrated in FIG. 1 is the simplicity of the mold shape that mates with the tip 34. As seen in FIG. 5, the mold forms a simple cylindrical recess, while In FIG. 1, the mold is machined to match the shape of the tip. A disadvantage of the tip configuration of FIG. 5 is that a witness ring can be observed on the finished plastic product at the point 66 where the mold meets the tip. Despite the change in tip shapes, insert 30, sleeve 32, recess 54 formed by the end assembly, and coil heater 56 disposed therein, remain the essentially the same.

Figure 6:
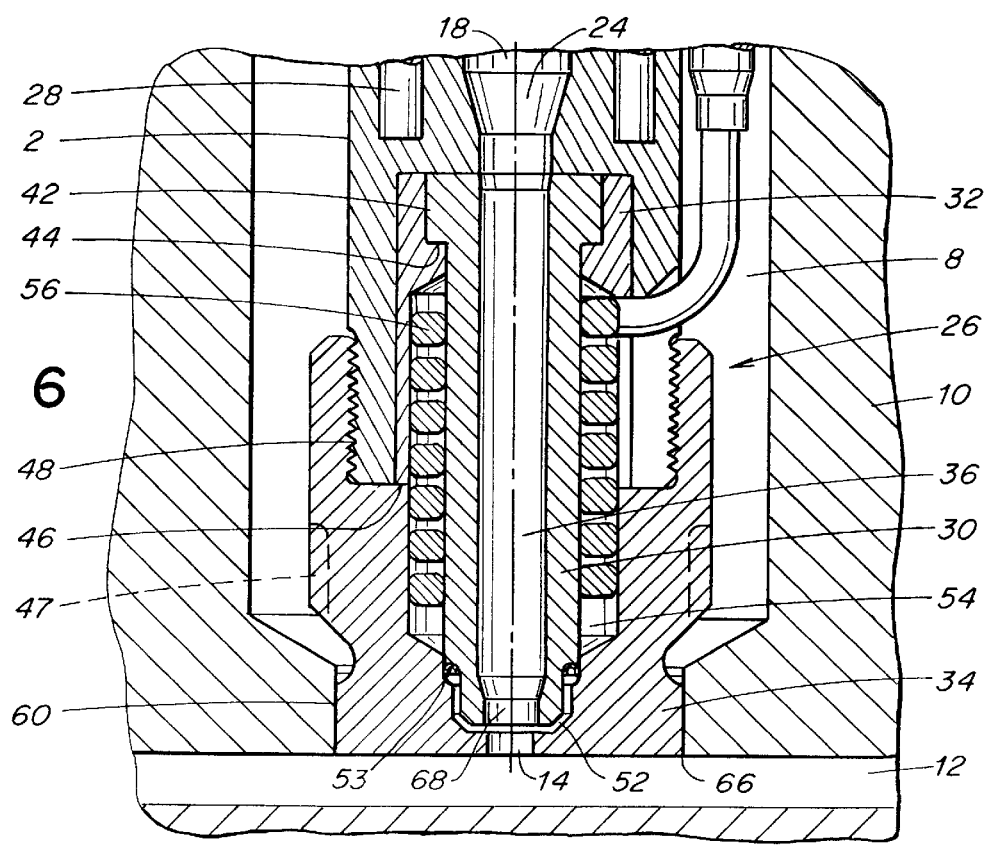
FIG. 6 is a cross-sectional view of a third illustrative embodiment of the present invention.

FIG. 6 shows a third illustrative embodiment of the invention in which the insert is a full flow insert with an open tip 68. As in FIG. 5, the gate 14 is formed by the tip 34. The full flow insert is less complex a shape than the cone shaped insert of FIGS. 1–4 and consequently less expensive to machine. Further, the full flow insert results in less pressure loss at the tip, as melt flow is more constricted through the narrower channels 40 of the cone shaped tip. Total pressure loss in the hot runner system can be important since the injection molding machine must be capable of delivering sufficient injection pressure to fill the cavity. The cone-shaped tip 38, on the other hand, maintains heat at the gate better than the full flow and is more appropriate for materials with narrow processing windows such as crystalline materials, for example, nylon or PET. Crystalline materials will often not remelt at the gate at the beginning of an injection cycle when used with a full flow insert. The cone-shaped tip 38 will also provide a smaller vestige on the molded product than with the full flow insert. As in FIGS. 1–5, the disposition of the coil heater 56 remains essentially the same, as the recess 54 formed by the sleeve 32, tip 34, and insert 30, essentially remains the same.

Figure 7:
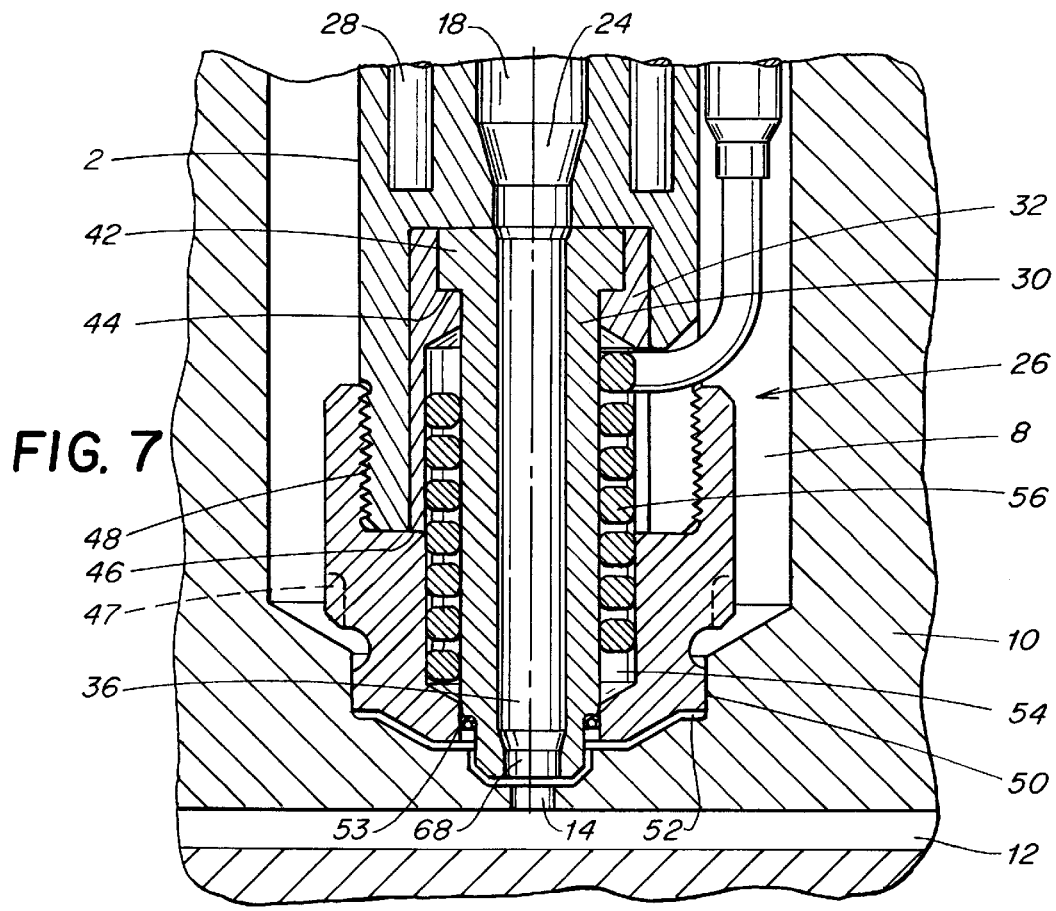
FIG. 7 is a cross-sectional view of a fourth illustrative embodiment of the present invention.

FIG. 7 is a fourth illustrative embodiment of the invention in which the gate is formed by the mold, as in FIG. 1. Rather than using an insert having a cone-shaped tip as in FIG. 1, however, the insert is a full flow insert as shown in FIG. 6. The disposition of the coil heater 56 essentially remains the same as in FIGS. 1–6 as the recess 54 formed by the sleeve 32, tip 34, and insert 30, essentially remains the same.

Figure 8:
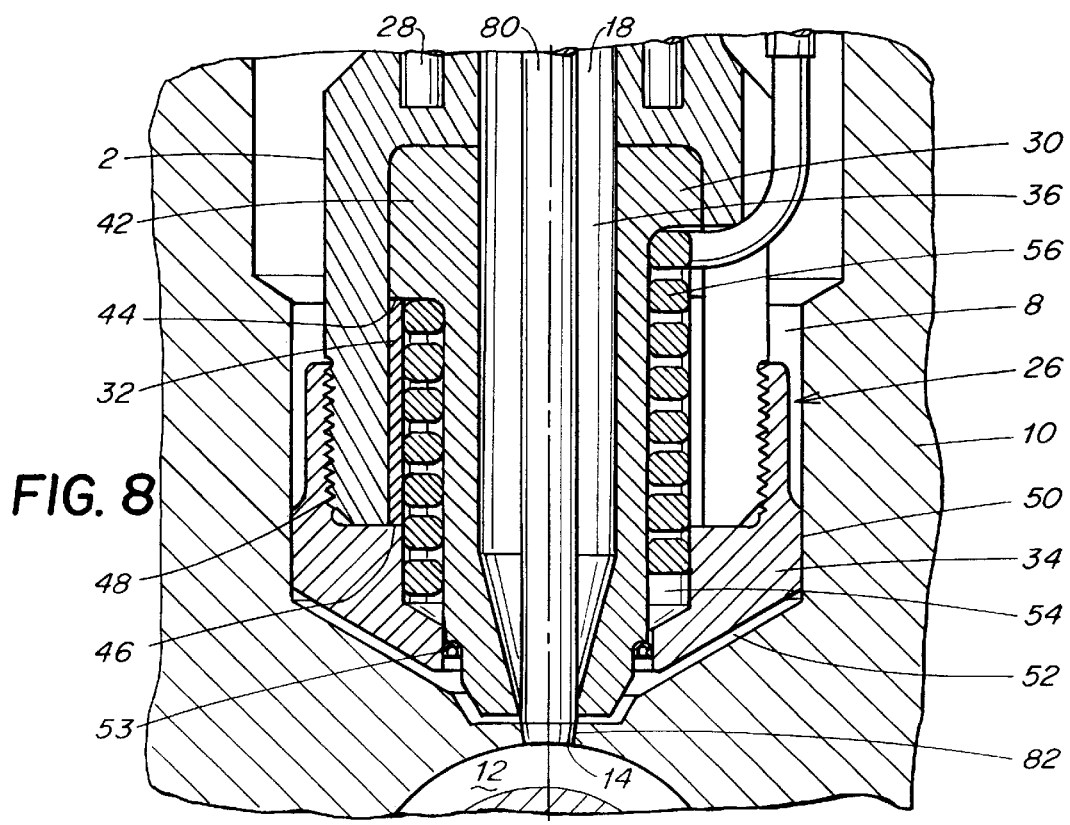
FIG. 8 is a cross-sectional view of a fifth illustrative embodiment of the present invention.

FIG. 8 is a fifth illustrative embodiment of the invention in which a valve pin 80 is used. The valve pin 80 is used to form a seal 82 with the mold 10 to stop melt from flowing into the cavity 12, while in the open position the valve is retracted away from the gate of the cavity and melt flow into the cavity is permitted. An alternative design for the end assembly 26 including the insert 30, tip 34 and sleeve 32 is shown. The bore 36 through the insert 30 has a wider diameter than in previous embodiments. The sleeve 32 still abuts the insert at 44, but no longer is irregularly shaped as FIGS. 1–7. Rather the sleeve 32 is simply a cylindrical shape. The tip 34 forms a seal with the mold at 50, and is still threaded over the nozzle body 2 to hold the sleeve 32 and insert 30 in place. The coil heater 56 is disposed in recess 54 formed by sleeve 32, insert 30, and tip 34. Clearly, other designs and configurations of the end assembly are possible, and the invention should not be construed to be limited to a particular end assembly design.

Use of a valve pin is more costly than the other types of tips used in FIGS. 1–7, as a mechanical actuator is necessary to retract and close the pin. However, closing the valve pin 80 at the end of an injection cycle results in little or no vestige on the molded product, as the end of the valve pin 80 forms a smooth surface with the mold cavity 12 when the valve pin is closed, as it is in FIG. 8. Furthermore, a valve pin is utilized in multiple nozzle, single cavity applications in which sequential injection from the nozzles is desired. Sequential injection is used, for example, to alter the location of the weld lines in a molded article.

Figure 9:
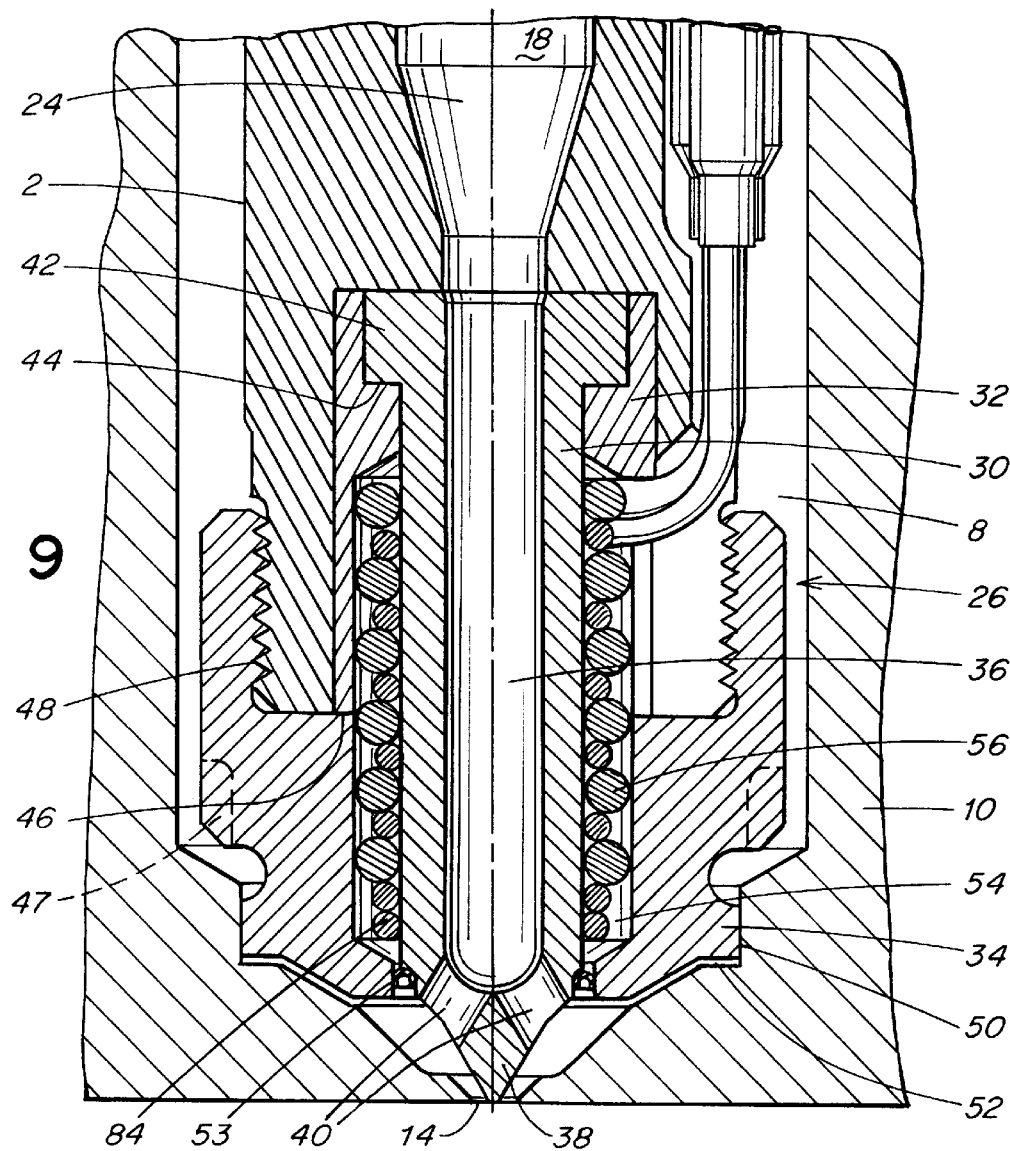
FIG. 9 is a cross sectional view of a sixth illustrative embodiment of the present invention.
Figure 9A:
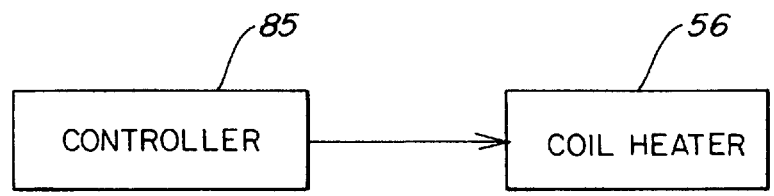
FIG. 9a is a schematic of a control circuit for the coil heater.
Figure 9B:
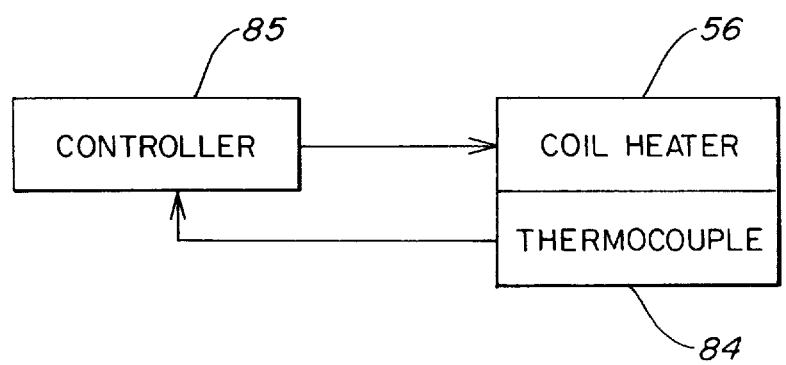
FIG. 9b is a schematic of an alternative embodiment of a control circuit for the coil heater.

FIG. 9 is a sixth illustrative embodiment of the invention in which a thermocouple 84 is interspersed with the coil heater 56. Alternatively, the thermocouple could be embedded within the coil heater in which the coil heater and thermocouple would appear substantially the same as in FIG. 1, but with two additional leads for the embedded thermocouple. The nozzle body 2 and end assembly 26 are the same as in FIGS. 1–4. The thermocouple senses the temperature of the insert 30, and enables an operator to control the insert to a specific set point temperature, rather than run the coil heater open loop as in FIGS. 1–8. Without the thermocouple the operator can adjust the intensity of the coil heater by adjusting the power supplied to the leads 58, but does not know the exact temperature at which the insert is operating. The voltage can be adjusted using controller 85 as shown in FIG. 9a. The thermocouple is preferred where exact temperature control is desired, for example in processing semi-crystalline materials where the processing temperature window is small. As shown in FIG. 9b, the controller 85 receives temperature feedback from the thermocouple 84, and can used to adjust the temperature of the thermocouple to a specific set point. Although the thermocouple is not shown in the embodiment of FIGS. 1–4, it can be used with the coil heater of any of the embodiments disclosed herein.

Operation of the embodiment shown in FIGS. 1–4 is shown in FIGS. 11 and 12. An injection cycle includes (1) an injection period during which substantial pressure is applied to the melt stream from the injection molding machine to pack the material in the mold cavity; (2) a reduction of the pressure from the injection molding machine for a hold period in which melt material is packed into the mold cavity; and (3) a cooling period in which the pressure decreases to zero, the article in the mold solidifies and the gate freezes off. The injection cycle is essentially the same whether using an insert having a cone-shape, a full flow insert, or a spiral insert, such as the spiral insert disclosed in U.S. Pat. No. 5,545,028, incorporated herein by reference. FIG. 11 shows the embodiment of FIGS. 1–4 between injection cycles, that is, after the melt 87 at the gate has frozen to end the cycle. As shown in FIG. 11, the coil heaters stay on throughout the three stages of the injection cycle, and between cycles. The coil heaters help maintain the melt at its optimum processing temperature but do not prevent the gate freeze off which ends the injection cycle. Thus, the coil heaters require no controlling other than for the purpose of maintaining a temperature level through the insert that keeps the melt as close to its optimum flow temperature as possible, while allowing gate freeze off to occur.

Figure 10:
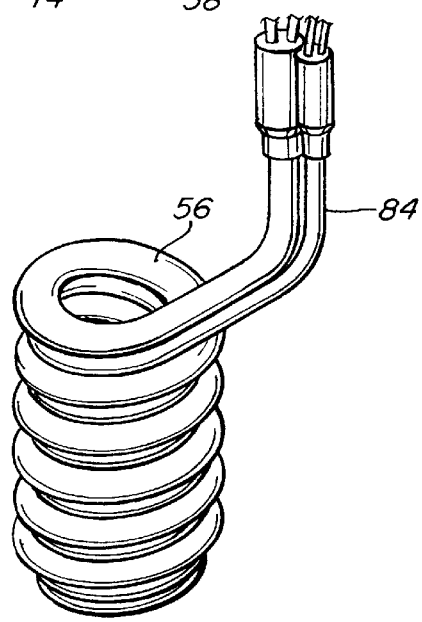
FIG. 10 is perspective view of the coil heater and thermocouple shown in FIG. 9.

FIG. 12 shows the initiation of another injection cycle in which the pressure and heat from the renewed injection of melt from the injection molding machine re-melts and blows the melt 87 frozen at the gate into the cavity 12. As seen in the figure, the cavity begins to refill as soon as the material at the gate is re-melted. If desired, a thermocouple 84 as described above and shown in FIGS. 9 and 10 could be used with the coil heater 56.

Figure 13:
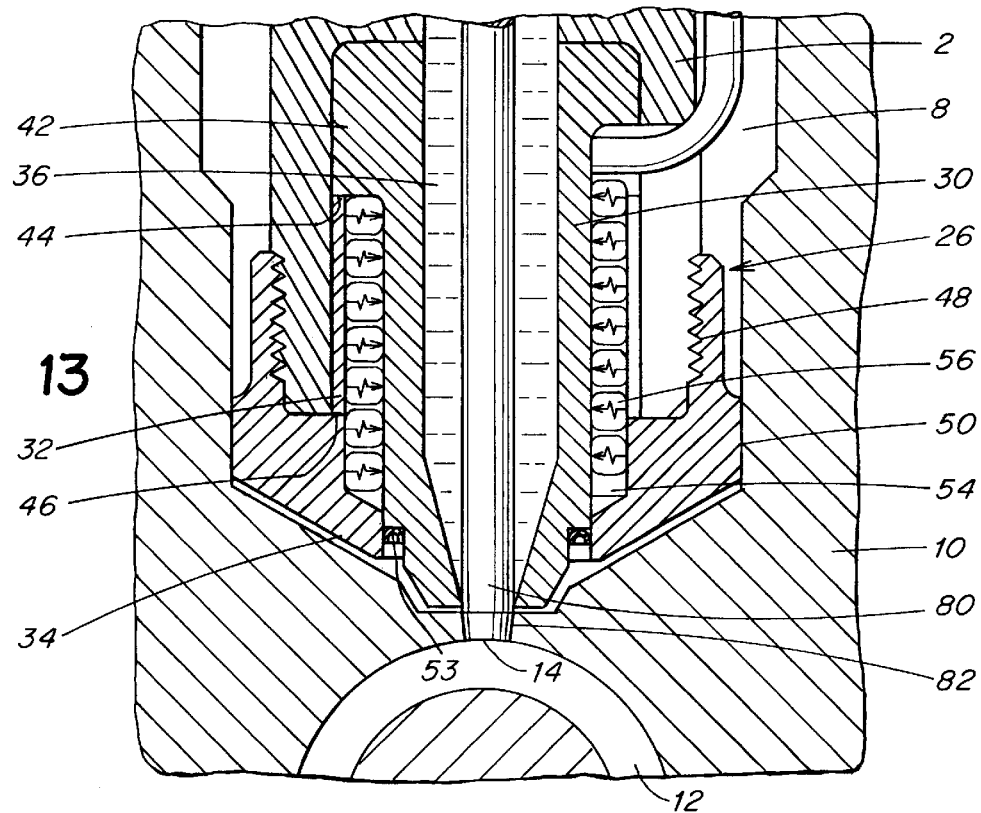
FIG. 13 is the cross-sectional view of FIG. 8, showing the melt at the gate before an injection cycle begins.
Figure 14:
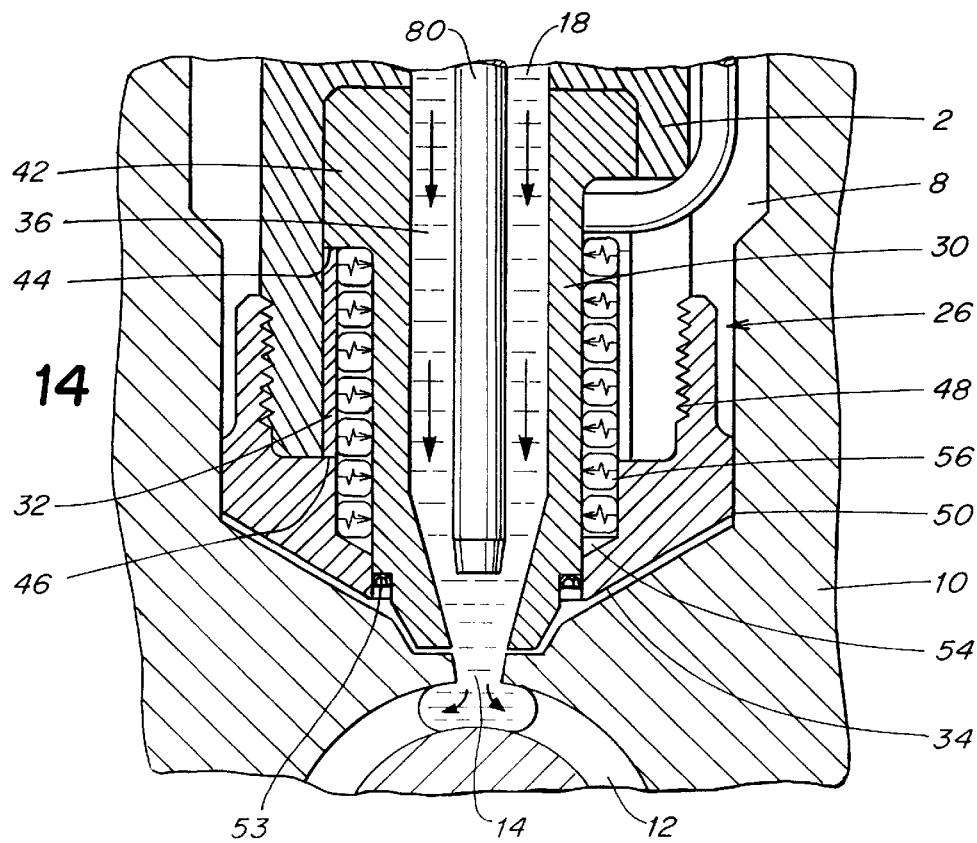
FIG. 14 is the cross-sectional view of FIG. 8, showing the melt injected into the cavity after an injection cycle begins.

FIGS. 13 and 14 show the operation of the embodiment shown in FIG. 8 in which a valve pin 80 is used. The injection cycle is different when using a valve pin. Here, the initiation and end of the injection cycle does not depend on the re-melting and freezing, respectively, of the melt at the gate, as in FIGS. 11 and 12. Rather, as is apparent from FIGS. 13 and 14, retraction of the valve pin permits the melt material to flow through the gate, and closing of the valve pin stops melt from flowing through the gate. As in FIGS. 11 and 12, the coil heaters remain on throughout, and in between, injection cycles, and help prevent material from freezing about the valve pin. Further, a thermocouple, as described above and shown in FIGS. 9 and 10 could be used with the coil heater 56.

Figure 15:
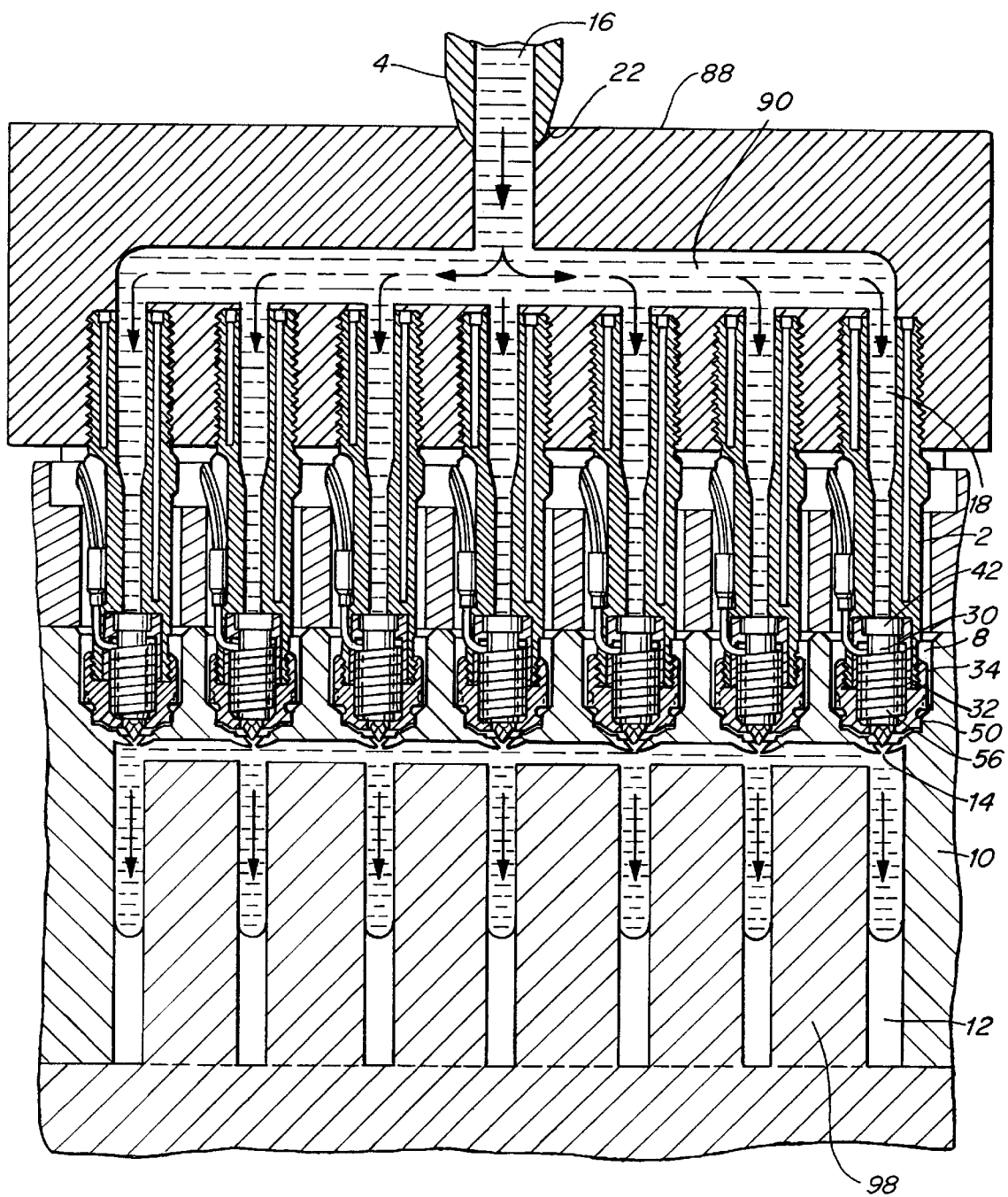
FIG. 15 shows one application of the embodiment of the invention shown in FIGS. 1–4.

One application of the present invention is shown in FIG. 15. A plurality of nozzle bodies 2 from the first illustrative embodiment of FIGS. 1–4 are attached to a manifold 88 which directly receives the extruder nozzle 4 of the injection molding machine. Although the cone-shaped insert 30 is used, other insert tips such as the valve gate, spiral flow, or full flow tip could be used. The manifold includes a central passage 90 which leads to the bores 18 of the plurality of nozzles. The mold cavity 12 is a single cavity with a plurality of gates 14 from which melt is injected from the nozzles. Such an application is appropriate for forming thin-walled complex shapes, such as an automotive battery container. The walls of the battery container are thin relative to the product size. Thus, cores 98 separating the walls can shift if the plastic does not flow evenly about the six cores, resulting in unacceptable, uneven part wall thicknesses. A thermocouple could also be wound with the coil heater 56 as in FIGS. 9 and 10.

In this application, the tip heaters 56 function to balance the flows through each nozzle by providing for variable heating of each nozzle tip. As described above, between injection cycles the plastic will freeze off in the gate forming a thin layer of frozen plastic. Upon initiation of injection the pressure exerted on the gate will blow the frozen plastic into the cavity and remelt it. The tip heater will be used to vary the temperature at the gate, varying the frozen material thickness, and varying the timing of the gate opening. By varying the timing of the gates the plastic flow through each gate can be altered so as to begin simultaneously, therefore balancing the system, and prevent shifting of the cores 98 due to uneven flow in the walls of the cavity.

Figure 16:
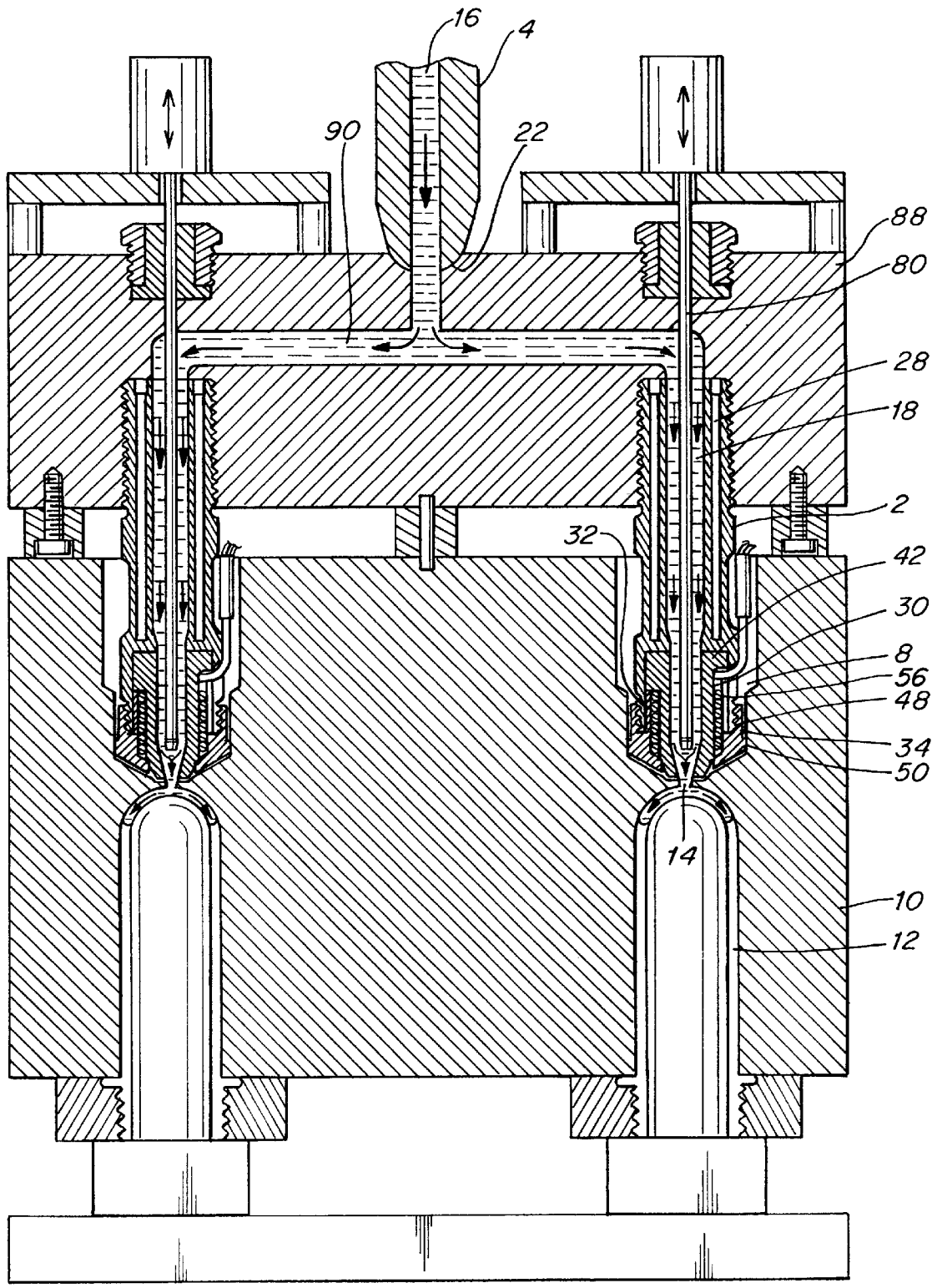
FIG. 16 shows one application of the embodiment of the invention shown in FIG. 8.

Another application of the present invention is shown in FIG. 16 in which the nozzle shown in FIG. 8 is used in a multiple nozzle application with a manifold 88. The mold cavity 12 forms a preform for a plastic bottle. Materials such as PET are used to form the bottle. When using semi-crystalline materials such as PET, if the temperature of the melt through the insert reduces, the crystallinity of the melt increases, which can result in a cloudy appearance in the finished product about the gate. The presence of the heater coil about the insert provides extra heat at the insert to reduce the amount of crystallinity at the gate.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding nozzle for injecting molten material into a mold cavity during an injection cycle, comprising:
   a nozzle body having a central bore through which the molten material passes during the injection cycle;
   an insert seated in the nozzle body, the insert having a central bore through which the molten material passes from the central bore of the nozzle body during the injection cycle;
   a tip attached to the nozzle body about the insert to form a seal with the mold cavity, and to insulate the insert from the mold so that there is an absence of contact between the insert and the mold, wherein a recess is formed between the insert and the tip; and
   a first heater disposed in the recess between the insert and the tip.

2. The injection molding nozzle of claim 1, further comprising a heating means for heating the nozzle body.

3. The injection molding nozzle of claim 2, wherein the heating means is at least one heat pipe disposed in the nozzle body.

4. The injection molding nozzle of claim 1, further comprising a sleeve that contacts said insert, said tip and said nozzle body.

5. The injection molding nozzle of claim 4, wherein said sleeve is biased against said insert by said tip, to maintain said insert seated in said nozzle body.

6. The injection molding nozzle of claim 1, further comprising a thermocouple coupled to the heater for sensing the temperature of the insert.

7. The injection molding nozzle of claim 6, wherein the heater is a coil heater and the thermocouple is one of wound with the coil heater and embedded in the coil heater.

8. The injection molding nozzle of claim 1, in combination with a controller coupled to the heater that maintains the heater on from one injection cycle to a next injection cycle.

9. The injection molding nozzle of claim 8, wherein the controller maintains the heater at a substantially constant temperature from one injection cycle to a next injection cycle.

10. The injection molding nozzle of claim 6, in combination with a controller coupled to the heater and thermocouple for adjusting the heater to a particular temperature.

11. The injection molding nozzle of claim 10, wherein the controller maintains the heater on from one injection cycle to a next injection cycle.

12. The injection molding nozzle of claim 11, wherein the controller maintains the heater at a substantially constant temperature from one injection cycle to a next injection cycle.

13. The injection molding nozzle of claim 1, wherein the heater is adapted to remain on from one injection cycle to a next injection cycle.

14. The injection molding nozzle of claim 8, wherein the heater is adapted to remain on at a substantially constant temperature from one injection cycle to a next injection cycle.

15. The injection molding nozzle of claim 14, further comprising a heating means for heating the nozzle body.

16. The injection molding nozzle of claim 1, wherein the insert includes one of a cone shaped tip, a full flow tip, a valve actuated tip, and a spiral shaped tip.

17. The injection molding nozzle of claim 1, in combination with another injection molding nozzle, wherein each of the injection molding nozzles injects molten material into the mold cavity.

18. The injection molding nozzle of claim 17, wherein each heater of each injection molding nozzle is adapted to be controllable independently from one another.

19. The injection molding nozzle of claim 18, wherein each heater includes a thermocouple coupled to the heater for sensing the temperature of the insert.

20. The injection molding nozzle of claim 18, wherein each heater is adapted to remain on from one injection cycle to a next injection cycle.

21. The injection molding nozzle of claim 2, wherein the heater is adapted to be controllable independent from the heating means.

22. An injection molding nozzle for injecting molten material into a mold cavity during an injection cycle, comprising:
    a nozzle body having a central bore through which molten material passes during the injection cycle;
    an insert seated in the nozzle body, the insert having a central bore through which molten material passes from the central bore of the nozzle body during the injection cycle; and
    a heater disposed about the insert, the heater being adapted to remain on from one injection cycle to a next injection cycle.

23. The injection molding nozzle of claim 22, wherein the heater is adapted to remain at a substantially constant temperature from one injection cycle to a next injection cycle.

24. The injection molding nozzle of claim 22, in combination with a controller coupled to the heater for maintaining the heater on from one injection cycle to a next injection cycle.

25. The injection molding nozzle of claim 22, further comprising a heating means for heating the nozzle body.

26. The injection molding nozzle of claim 25, wherein the heater is adapted to be controllable independent from the heating means.

27. The injection molding nozzle of claim 25, wherein the heating means includes at least one heat pipe.

28. The injection molding nozzle of claim 27, wherein the heater is a coil heater.

29. The injection molding nozzle of claim 26, further comprising a thermocouple coupled to the heater for sensing the temperature of the insert.

30. The injection molding nozzle of claim 29, wherein the heater is a coil heater and the thermocouple is one of wound with the coil heater and embedded in the coil heater.

31. The injection molding nozzle of claim 22, in combination with a controller coupled to the heater that maintains the heater on from one injection cycle to a next injection cycle.

32. The injection molding nozzle of claim 31, wherein the controller maintains the heater at a substantially constant temperature from one injection cycle to a next injection cycle.

33. The injection molding nozzle of claim 29, in combination with a controller coupled to the heater and thermocouple for adjusting the heater to a particular temperature.

34. The injection molding nozzle of claim 33, wherein the controller maintains the heater on from one injection cycle to a next injection cycle.

35. The injection molding nozzle of claim 34, wherein the controller maintains the heater at a substantially constant temperature from one injection cycle to a next injection cycle.

36. The injection molding nozzle of claim 22, wherein the insert includes one of a cone shaped tip, a full flow tip, a valve actuated tip, and a spiral shaped tip.

37. The injection molding nozzle of claim 22, in combination with another injection molding nozzle, wherein each of the injection molding nozzles injects molten material into the mold cavity.

38. The injection molding nozzle of claim 37, wherein each heater of each injection molding nozzle is adapted to be controllable independently from one another.

39. The injection molding nozzle of claim 38, wherein each heater includes a thermocouple coupled to the heater for sensing the temperature of the insert.

40. A plurality of injection molding nozzles for injecting molten material into a single mold cavity, each nozzle comprising:
    a nozzle body having a central bore through which material passes during the injection cycle;
    an insert seated in the nozzle body, the insert having a central bore through which molten material passes from the central bore of the nozzle body during the injection cycle; and
    a heater disposed about the insert; wherein each of the heaters of each of the plurality of injection molding nozzles is adapted to be controllable independent from one another.

41. The plurality of injection molding nozzles of claim 40, each nozzle further comprising a first heater for heating the nozzle body.

42. The plurality of injection molding nozzles of claim 41, wherein in each injection molding nozzle the heater is adapted to be controllable independent from the first means.

43. The plurality of injection molding nozzles of claim 40, in combination with a plurality of controllers, wherein each nozzle has a respective controller associated therewith for controlling the heater of that nozzle.

* * * * *